(12) United States Patent
Lau et al.

(10) Patent No.: US 6,636,523 B1
(45) Date of Patent: Oct. 21, 2003

(54) FLOW CONTROL USING RULES QUEUE MONITORING IN A NETWORK SWITCHING SYSTEM

(75) Inventors: Michael Vengchong Lau, Cupertino, CA (US); Shashank C. Merchant, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/237,861

(22) Filed: Jan. 27, 1999

(51) Int. Cl.[7] .............................................. H04L 12/56
(52) U.S. Cl. ...................................... 370/415; 370/230
(58) Field of Search ................................ 370/401, 230, 370/235, 412, 414, 416, 418, 218, 428, 429

(56) References Cited

U.S. PATENT DOCUMENTS

| | | | | |
|---|---|---|---|---|
| 5,493,566 A | * | 2/1996 | Ljungberg et al. | |
| 5,515,376 A | | 5/1996 | Murthy et al. | |
| 5,787,073 A | * | 7/1998 | Ikeda | 370/236 |
| 5,828,653 A | * | 10/1998 | Goss | 370/230 |
| 5,841,773 A | * | 11/1998 | Jones | 370/395 |
| 6,091,709 A | * | 7/2000 | Harrison et al. | 370/235 |
| 6,118,761 A | * | 9/2000 | Kalkunte et al. | 370/229 |

* cited by examiner

Primary Examiner—Kenneth Vanderpuye

(57) ABSTRACT

A novel method of flow control in a multiport data switching system having a decision making engine for controlling data forwarding between receive ports and at least one transmit port. Data blocks representing received data packets are placed in a plurality of data queues to be processed by the decision making engine. The data queues allocated to the receive ports are monitored to produce a flow control threshold signal for a selected data queue to indicate a heavy traffic condition of a receive port corresponding to the selected data queue. For example, the flow control threshold signal may indicate that the receive port is close to an overflow condition. Monitoring of a selected data queue may be performed by comparing a write pointer indicating a memory location for writing the data blocks into the selected data queue with a read pointer indicating a memory location for reading the data blocks from the selected data queue. The flow control threshold signal is produced when a predetermined number of memory entries in the data queue is occupied.

20 Claims, 11 Drawing Sheets

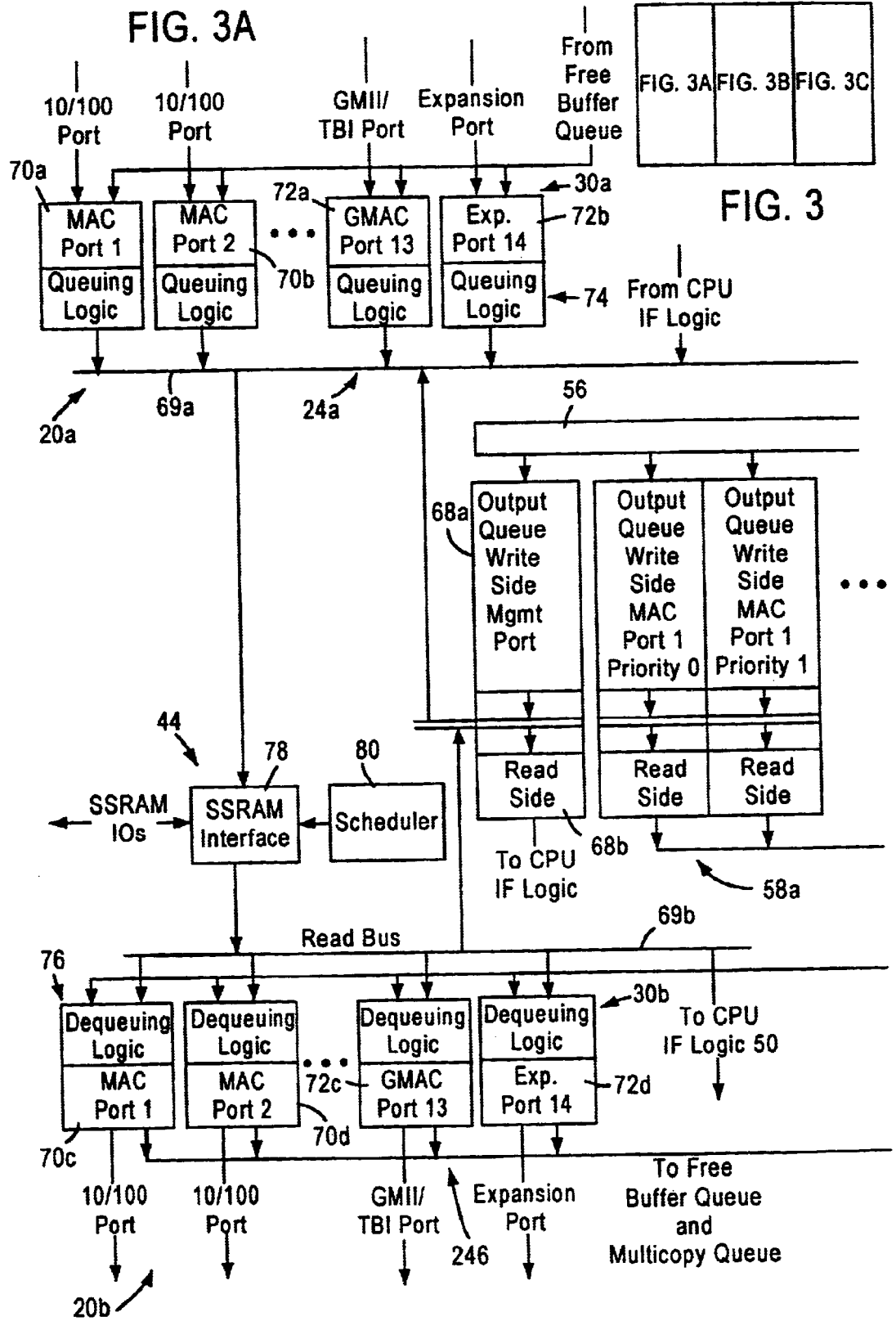

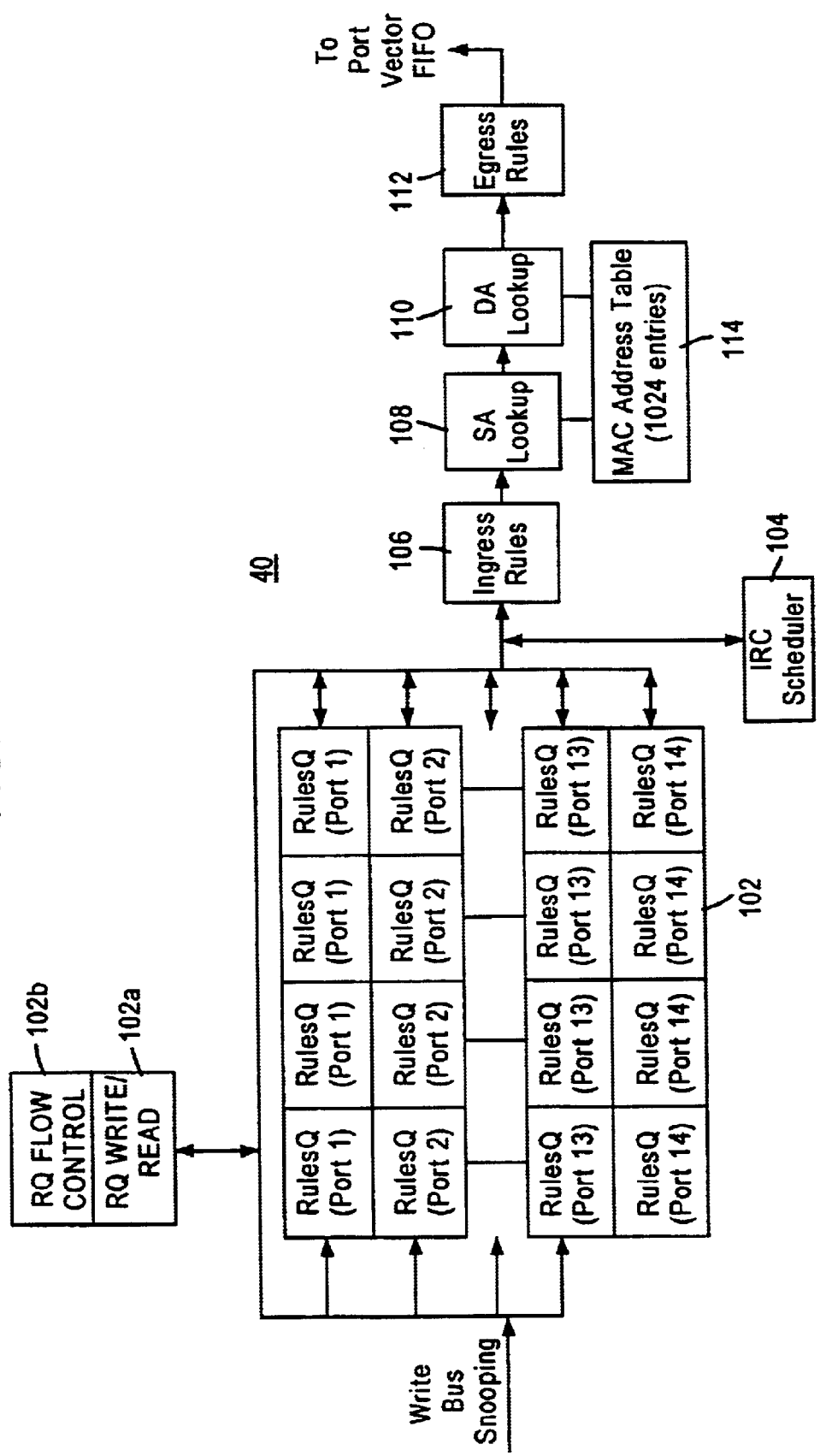

FIG. 6

FLOW CONTROL USING RULES QUEUE MONITORING IN A NETWORK SWITCHING SYSTEM

FIELD OF THE INVENTION

This invention relates to data communication systems, and more particularly, to flow control in a multiport network switch.

BACKGROUND ART

A multiport network switch may be provided in a data communication network to enable data communication between multiple network stations connected to various ports of the switch. A logical connection may be created between receive ports and transmit ports of the switch to forward received frames to appropriate destinations. Based on rules queues containing information on receive frames, a frame forwarding system selectively transfers received frames to a destination station.

A flow control procedure is-used in the network switch for controlling the transfer of data among ports to prevent overload. Conventionally, flow control is performed based on monitoring receive buffers of switch ports. However, to increase the accuracy of flow control, it would be desirable to perform flow control based on monitoring the rules queues in the frame forwarding system.

DISCLOSURE OF THE INVENTION

The invention provides a novel method of flow control in a multiport data switching system having a decision making engine for controlling data forwarding between receive ports and at least one transmit port. The method comprises placing data blocks representing received data packets in a plurality of data queues to be processed by the decision making engine in accordance with a prescribed algorithm to determine a selected transmit port. The plurality of data queues corresponds to the plurality of the receive ports. The data queues are monitored to produce a flow control threshold signal for a selected data queue to indicate a heavy traffic condition of a receive port corresponding to the selected data queue. For example, the flow control threshold signal may indicate that the receive port is close to an overflow condition. The flow control threshold signal may be produced when the content of the selected data queue reaches a preset value.

Preferably, monitoring of a selected data queue may be performed by comparing a write pointer indicating memory locations for writing the data blocks into a selected data queue with a read pointer indicating memory locations for reading the data blocks from the selected data queue.

In accordance with one aspect of the invention, the decision making engine includes a plurality of queuing devices corresponding to the plurality of the receive ports for creating queues of data blocks representing the data packets received by the corresponding receive ports. Logic circuitry is responsive to the plurality of queuing devices for processing the data blocks in accordance with a prescribed algorithm to identify the at least one selected transmit port for each data packet. A flow control circuit is provided for monitoring the queues of data blocks to produce a flow control threshold signal for a selected queue of data blocks. For example, the flow control threshold signal for a selected queue may be produced when the selected queue accumulates a predetermined number of the data blocks.

Preferably, the flow control circuit may comprise a threshold circuit, a write pointer circuit and a read pointer circuit. The flow control circuit may compare a write pointer to a selected queue with a read pointer to the selected queue to determine content of the selected queue.

The write pointer circuit for producing the write pointer may comprise a write pointer selector for selecting the write pointer for the selected queue. The write pointer selector may be controlled by write enabling signal that enables writing the data blocks into the selected queue. The write pointer circuit may further comprise an incrementer/encoder for incrementing and encoding a selected write pointer produced by the write pointer selector.

The read pointer circuit for producing the read pointer may comprise a read pointer selector for selecting the read pointer for the selected queue. The read pointer selector may be controlled by a grant signal that enables reading the data blocks from the selected queue. The grant signal may be produced by a scheduler responsive to a request from a queuing device that holds the selected queue. The read pointer circuit may further comprise an incrementer/encoder for incrementing and encoding a selected read pointer produced by the read pointer selector.

For example, each queuing device may comprise a queue memory array arranged in rows and columns for storing a queue of data blocks. To monitor a data queue, a write row pointer indicating a row for writing the data blocks into a selected queue memory array may be compared with a read row pointer indicating a row for reading the data blocks from the selected queue memory array.

Various objects and features of the present invention will become more readily apparent to those skilled in the art from the following description of a specific embodiment thereof, especially when taken in conjunction with the accompanying drawings.

BRIEF DESCRIPTION OF THE DRAWINGS

FIG. 4 is a block diagram of an internal rules checker.

FIG. 6 is a diagram illustrating the arrangement of RQ frame pointer SRAMs for receive ports of the multiport switch.

BEST MODE FOR CARRYING OUT THE INVENTION

Figure 1:
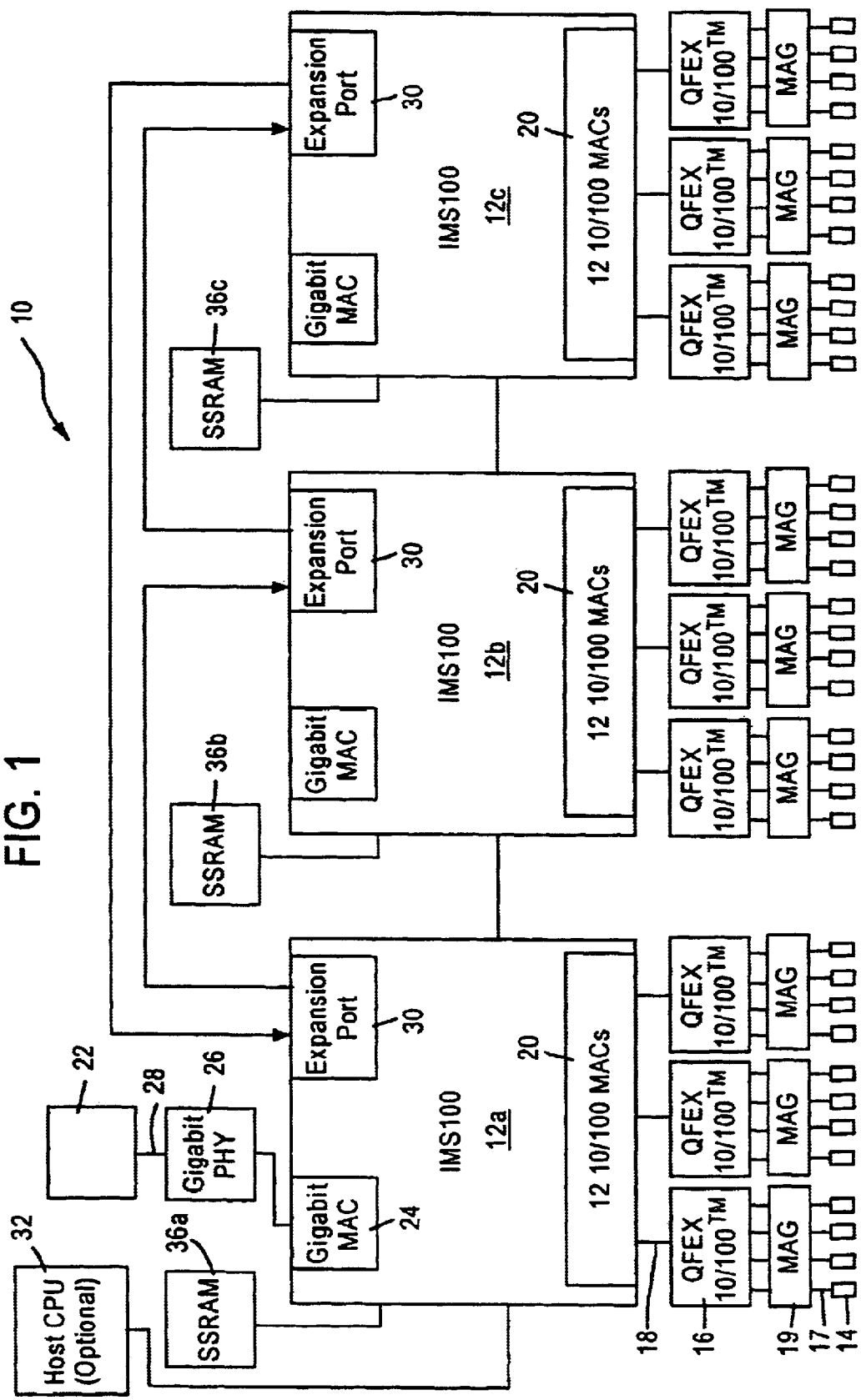
FIG. 1 is a block diagram of a packet switched network including a multiport switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding shared media independent interface (MII) 18. In particular, each 10/100 PHY transceiver 16 is configured for sending and receiving data packets between the switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
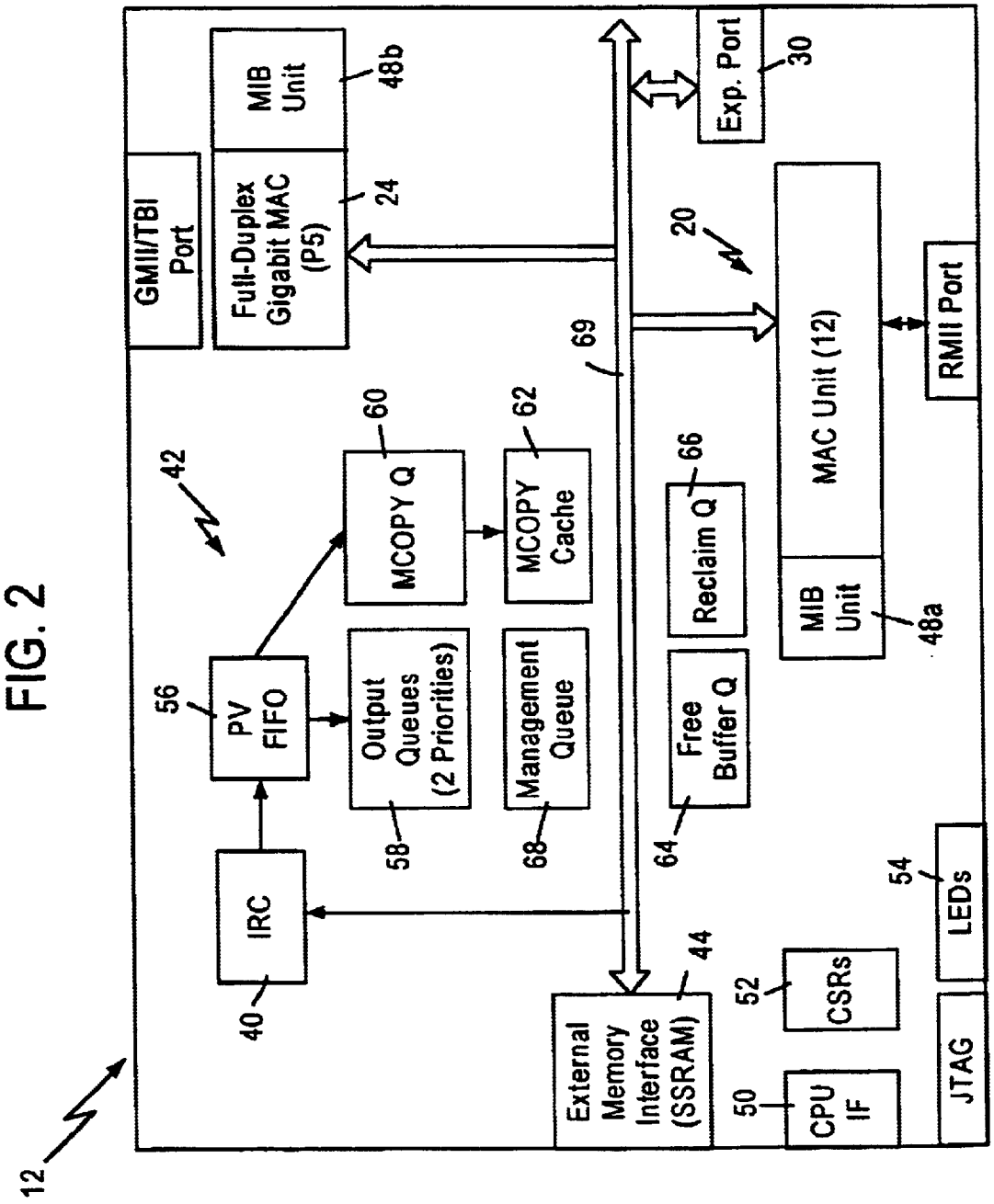
FIG. 2 is a block diagram of the multiport switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, memory structures, and MIB counter information. The memory 36 is preferably a pipelined burst SSRAM having a 64-bit wide data path, a 16-bit wide address path, and a memory size of at least 512 Kbytes, capable of running at clock frequencies up to 66 MHz.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data packet stored at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (e.g., via a gateway 22) or a prescribed group of stations. The IRC 40 may also determine that the received data packet should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies corresponds to the number of ports specified in the port vector FIFO, the port vector is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
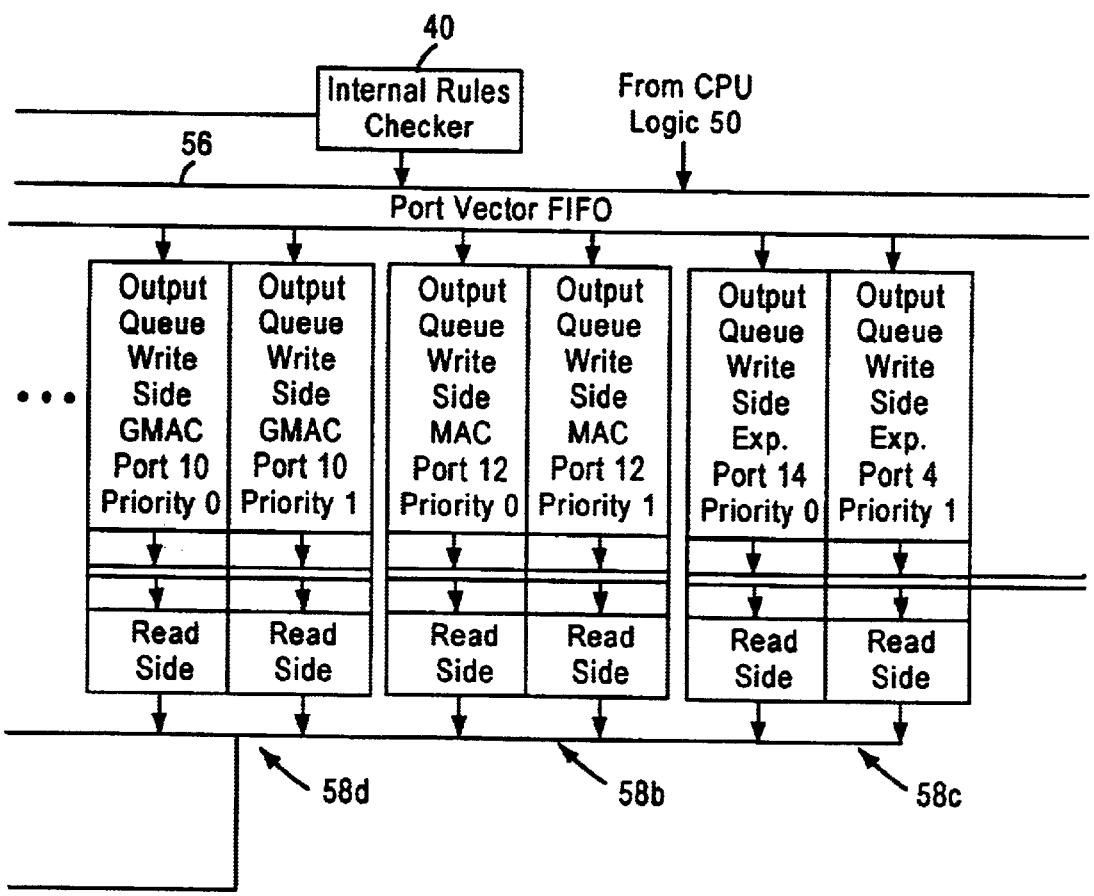
FIG. 3 is a block diagram illustrating in detail the switching subsystem of FIG. 2.
Figure 3C:
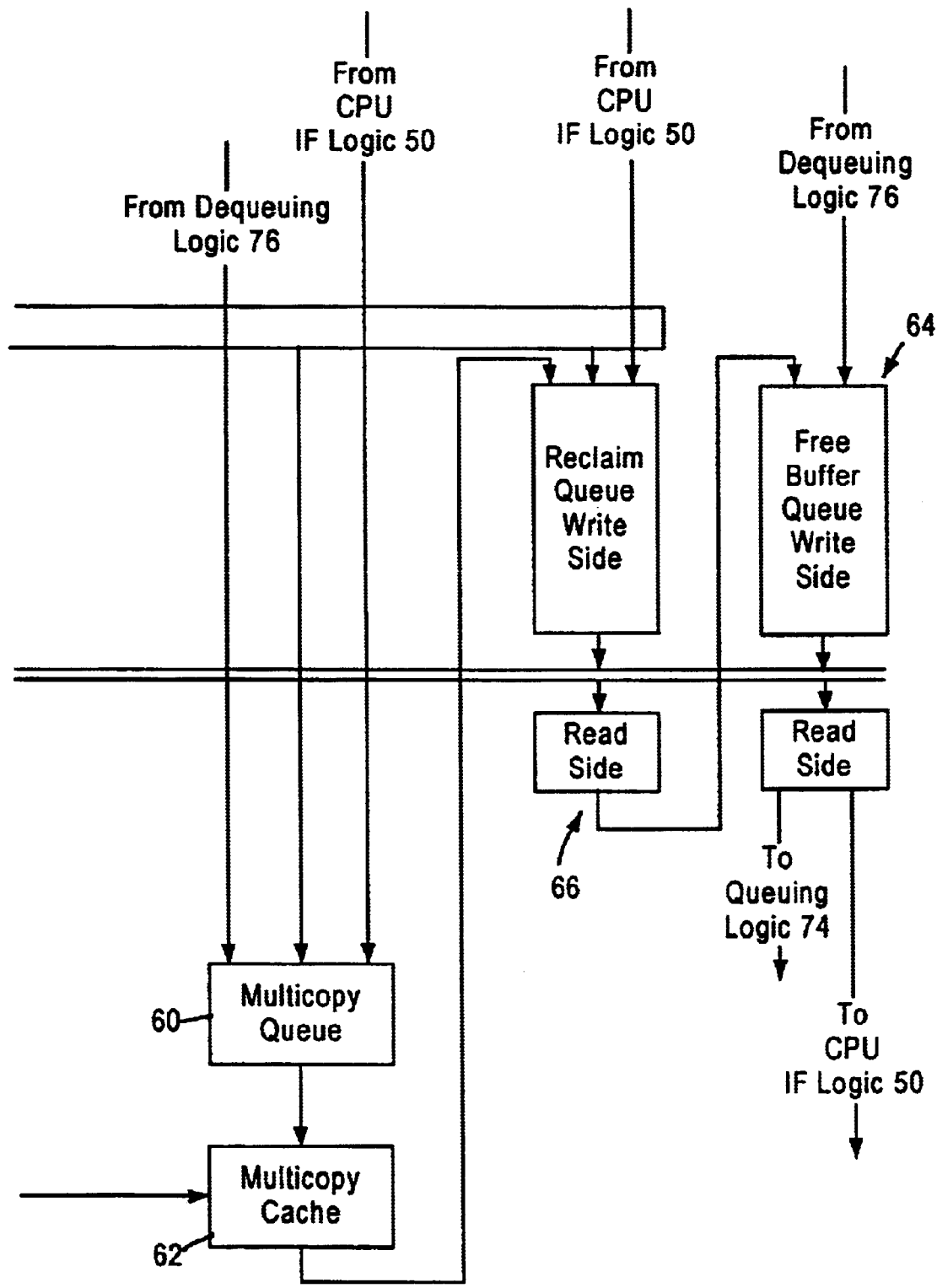

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include three (3) quad-MAC enhanced (QMACE) modules 70 configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; and module 70c performs receive MAC operations for 10/100 Mb/s switch ports 8, 9, 10, and 11. The QMACE modules 70d, 70e, and 70f perform the transmit MAC operations for the 10/100 Mb/s switch ports complementary to modules 70a, 70b, and 70c, respectively.

The receive portions 24a and 30a of the gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 70c, 72a, and 72b include queuing logic 74 for transferring of receive data from the corresponding internal receive FIFO to the external memory 36 and the rules checker 40. Each of the transmit MAC modules 70d, 70e, 70f, 72c, and 72d include dequeuing logic 76 for transferring data from the external memory 36 to the corresponding internal transmit FIFO. The queuing logic 74 fetches frame pointers from the free buffer queue 64, and uses the fetched frame pointers to store receive data to the external memory 36 via the external memory interface controller 44. The frame buffer pointer specifies the location in external memory 36 where the received data frame will be stored by the receive FIFO. The queuing logic 74 issues a write request to the external memory interface 44.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC 24a stores a data frame in an internal FIFO upon reception from the corresponding switch port. The corresponding queuing logic 74 obtains a frame pointer and sends a write request to the external memory interface 44. The scheduler 80 schedules the write request with other write requests or any read requests from the dequeuing logic 76, and generates a grant for the requesting queuing logic 74 to initiate a transfer at the scheduled event (i.e., slot). The frame data is then transferred over data bus 68a from the receive FIFO to the external memory 36 in a direct memory access (DMA) transaction during the assigned slot. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the bus 68a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 58 is processed separately by the host CPU 32 via the CPU interface 50.

As shown in FIG. 3, each of the transmit MAC units 70d, 70e, 70f, 72d, and 72c have an associated output queue 58a, 58b, 58c, 58d, and 58e, respectively. Each of the output queues 58 have a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58e for the gigabit transmit MAC 72c. The dequeuing logic 76 for the transmit gigabit port 24b takes the frame pointer from the corresponding gigabit port output queue 58e, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the frame data in a DMA transaction from the location in external memory 36 pointed to by the frame pointer, stores the frame data in the internal transmit FIFO for transmission by the transmit gigabit MAC 72c. If the frame pointer specifies a unicopy transmission, the frame, pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above, the internal rules checker (IRC) 40 monitors (i.e., "snoops") the data bus to determine the frame pointer value and the header information of the received frame (including source, destination, and VLAN address information). The IRC 40 uses the frame pointer value and the associated header information to determine which MAC ports will output the data frame stored at the location specified by the frame pointer.

As shown in FIG. 4, the IRC 40 contains a rules queue (RQ) circuit having multiple rules queues 102 of frame pointers and frame header information for frames received by the receive ports of the IMS 12. A single rules queue 102 is assigned to each receive port of the IMS 12. In particular, rules queues 1 to 12 are provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30.

Figure 5:
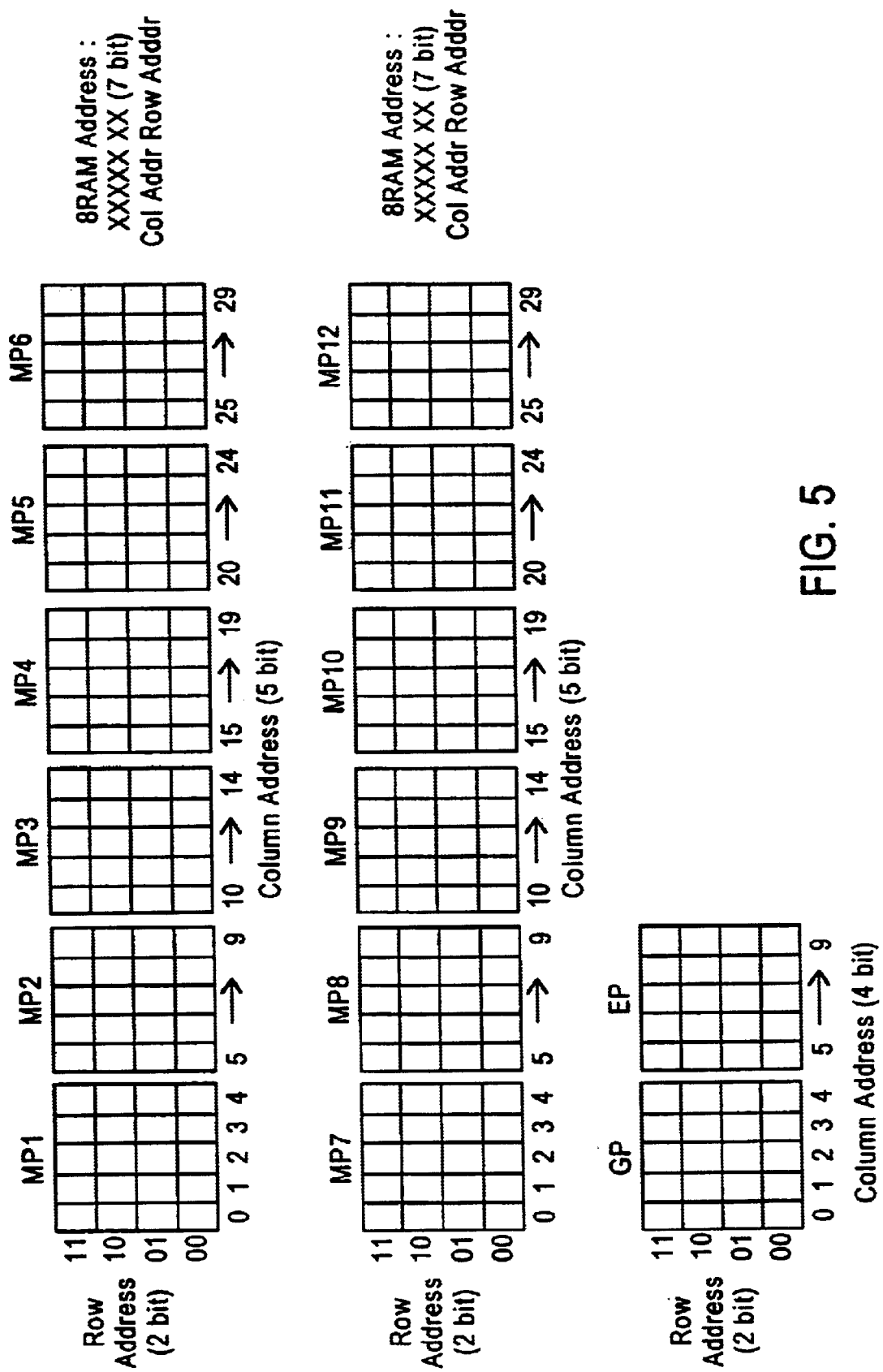
FIG. 5 shows the arrangement of rules queue (RQ) data SRAMs for receive ports of the multiport switch.
Figure 6:
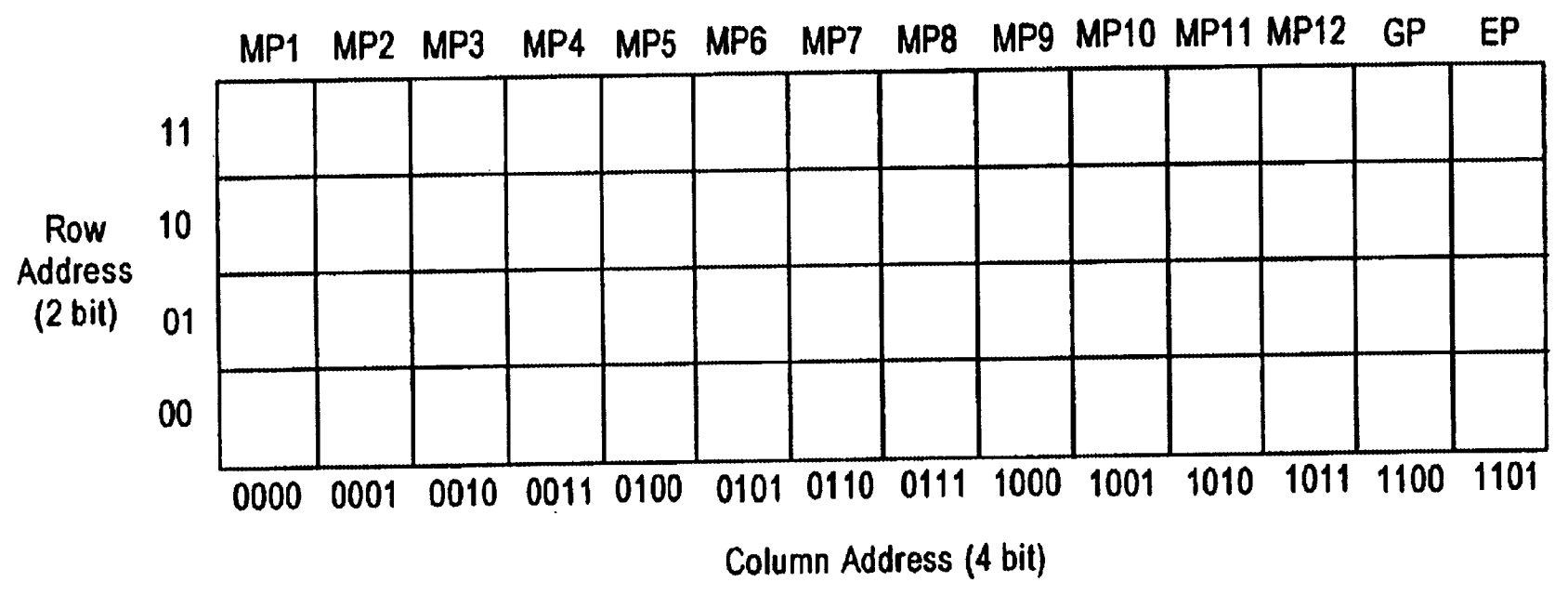

Each rules queue 102 may comprise an RQ data static random access memory (SRAM) having four 40-byte entries for storing frame headers, and an RQ frame pointer SRAM having four 13-bit entries for storing frame pointers. The RQ data and RQ frame pointer SRAMs have memory arrays arranged in rows and columns. Exemplary arrangements of the RQ data SRAMs and RQ frame pointer SRAMs for MAC ports 1 to 12 (MP1 to MP 12), gigabit port (GP) and expansion port (EP) are shown in FIGS. 5 and 6, respectively. For example, the RQ data SRAMs in FIG. 5 may contain four rows, each of which is capable of storing a single 40-byte entry of RQ data. The RQ frame pointer SRAMs in FIG. 6 may have four rows, each of which is capable of storing a 13-bit frame pointer entry.

In addition to the RQ data and RQ frame pointer SRAMs, the RQ circuit comprises RQ write/read logic 102a that controls writing data into the RQ data and RQ frame pointer SRAMs and reading data from the RQ data and RQ frame pointer SRAMs. The write/read logic 102a may include a flow control circuit 102b that monitors rules queues 102 to perform flow control.

The IRC 40 monitors the data bus 68 to place in each rules queue 102 the header information and frame pointers transferred by the queuing logic 74 of the corresponding receive module to the external memory 36. An IRC scheduler 104 performs scheduling of data transfer from the corresponding rules queue 102 to IRC logic circuits such as ingress rules logic 106, source address (SA) lookup logic 108, destination address (DA) lookup logic 110 and egress rules logic 112 to produce a forwarding descriptor supplied to the port vector FIFO 56. In particular, when a rules queue 102 has data, it requests the IRC scheduler 104 to enable transferring the data to the IRC logic circuit for processing. The IRC scheduler 104 grants requests from the rules queues 102 in accordance with a preset scheduling scheme.

Based on data read from the rules queues 102, the ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA and DA lookup logic circuits 108 and 110 search an IRC MAC address table 114 for entries associated with the MAC source and destination addresses for the corresponding frame. If source and destination address data of a frame match with the address table entries, the egress rules logic 112 checks each transmit port in the port vector list produced by the DA lookup logic circuit 110 to remove or mask the disabled ports, the ports that do not belong to a required VLAN, and the port, from which the frame is received. As a result, the egress rules logic 112 generates a forwarding descriptor including a port vector identifying each MAC port that should receive the corresponding frame.

In accordance with the present invention, the IRC 40 performs monitoring of rules queues 102 to provide flow control in the IMS 12. In particular, the flow control circuit 102b compares write pointers indicating locations for writing data in the RQ data SRAMs with read pointers indicating locations in the RQ data SRAMs for reading data. For example, the flow control logic 102b may compare row write pointers and row read pointers respectively indicating rows in the RQ data SRAMs for writing and reading RQ data. This comparison indicates an occupied portion of the RQ data SRAM for a particular receive port. When a predetermined portion of the RQ data SRAM for the receive port is occupied, the flow control logic 102b produces a flow control threshold signal sent to the switching subsystem 42 to signal a heavy traffic at the receive port. For example, the flow control threshold signal may indicate that the receive port is close to an overflow condition. In response, to the flow control threshold signal, the switching subsystem 42 takes appropriate actions to stop data transmission from a station connected to the corresponding receive port.

Figure 7:
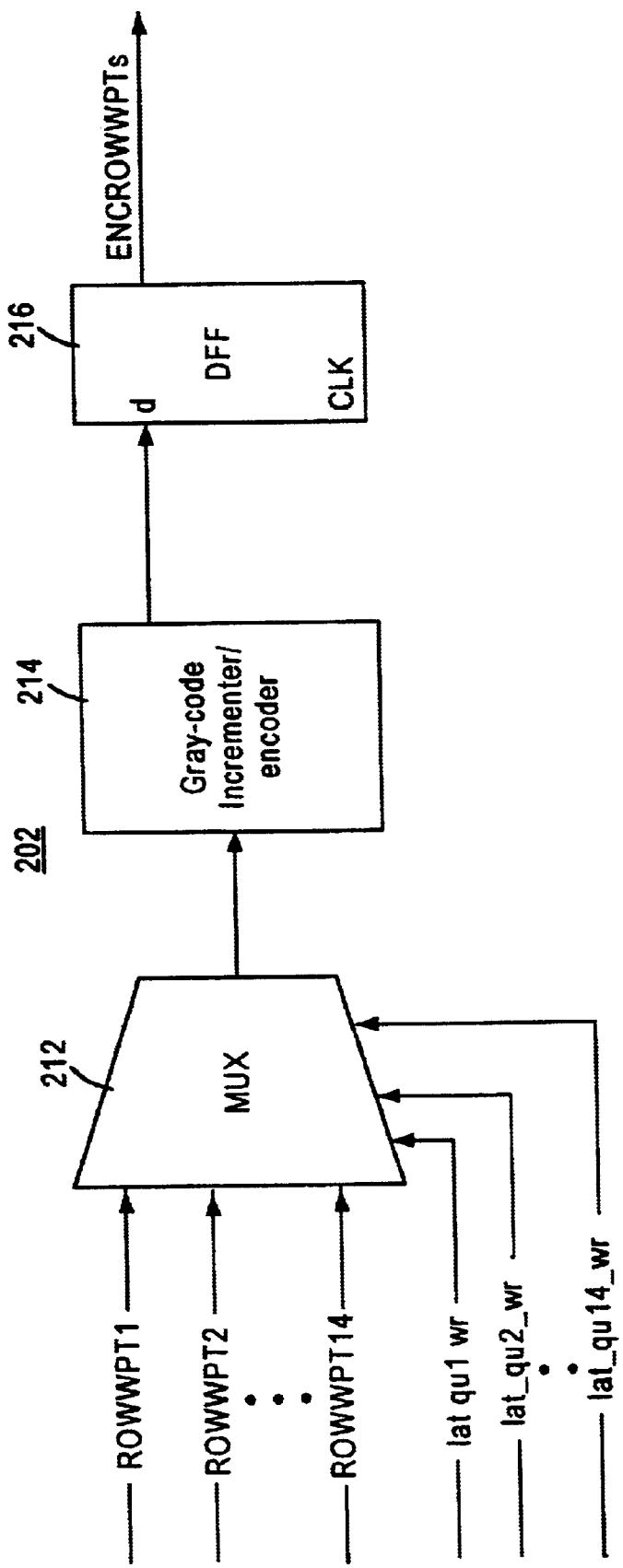
FIG. 7 is a block diagram of row write pointer logic.

The flow control circuit 102b may include row write pointer logic 202, row read pointer logic 204 and threshold status logic 206. Referring to FIG. 7, the row write-pointer logic 202 comprises a multiplexer 212 supplied with row write pointers ROWWPT1 to ROWWPT14 indicating rows for writing data to the RQ data SRAMs of rules queues 1 to 14, respectively. The multiplexer 212 is controlled by write enabling signals for the corresponding rules queues 1 to 14. Thus, when writing to an i-th rules queue 102 is enabled (where $1 \subseteq i \subseteq 14$), the corresponding row write pointer ROWWPTi is selected at the output of the multiplexer 212.

Figure 8:
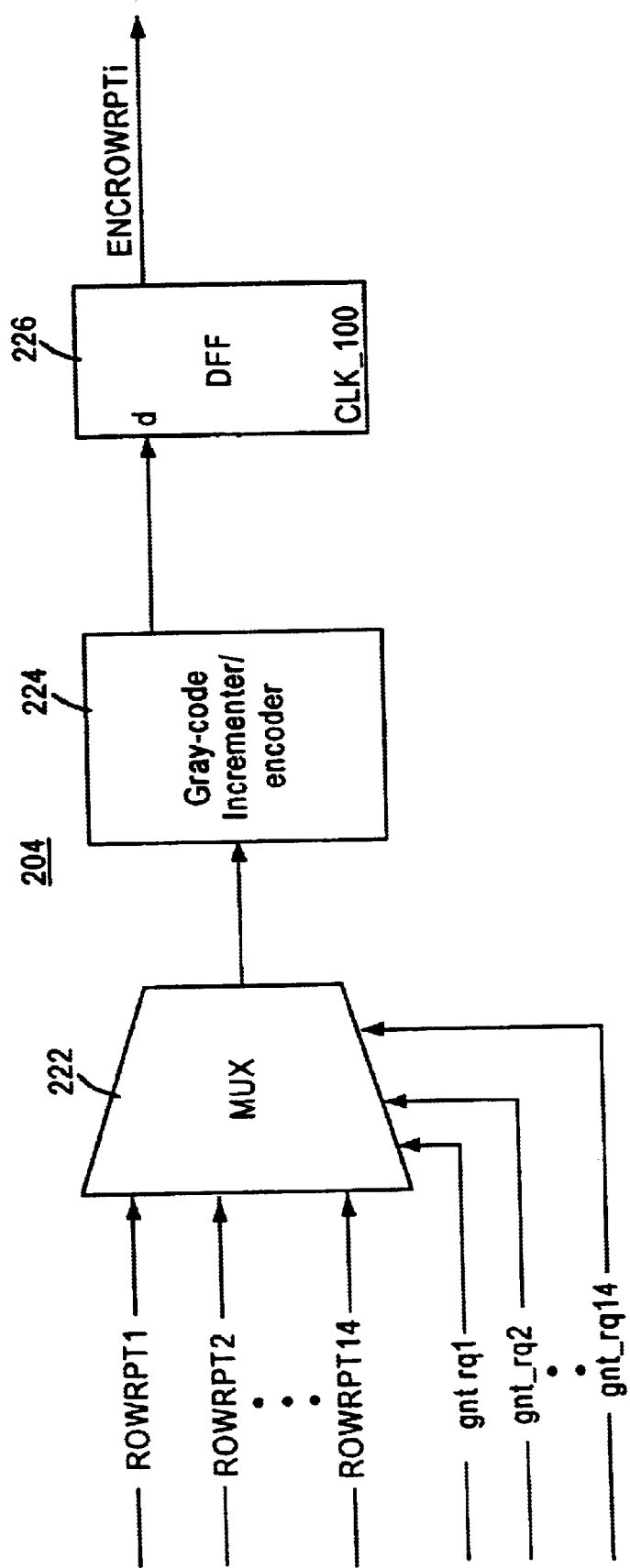
FIG. 8 is a block diagram of row read pointer logic.

The output of the multiplexer 212 is coupled to a Gray-code incrementer/encoder 214, which increments and encodes the row write pointer ROWWPTi using a Gray code. As known to one skilled in the art, an n-bit binary Gray code is an enumeration of all n-bit binary strings so that successive elements differ in exactly one bit position, i.e. numbers are encoded so that adjacent numbers have a single digit differing by 1. A D-flip flop 216 may be coupled to the output of the encoder 214 synchronizes output of a Gray-code encoded row write pointer ENCROWWPTi Referring to FIG. 8, the row read pointer logic 204, comprises a multiplexer 222 supplied with row read pointers ROWRPT1 to ROWRPT14 indicating rows for reading data from the RQ data SRAMs of rules queues 1 to 14, respectively. The multiplexer 212 is controlled by grant signals issued by the IRC scheduler 104 in response to requests from the corresponding rules queues 1 to 14. Thus, when IRC scheduler enables RQ data reading from an i-th rules queue 102, the corresponding row read pointer ROWRPTi is selected at the output of the multiplexer 222. A Gray-code increment/encoder 224 performs incrementing and encoding of row read pointer ROWRPTi using a Gray code. A D-flip flop 226 coupled to the output of the encoder 224 synchronizes output of a Gray-code encoded row read pointer ENCROWRPTi.

Figure 9:
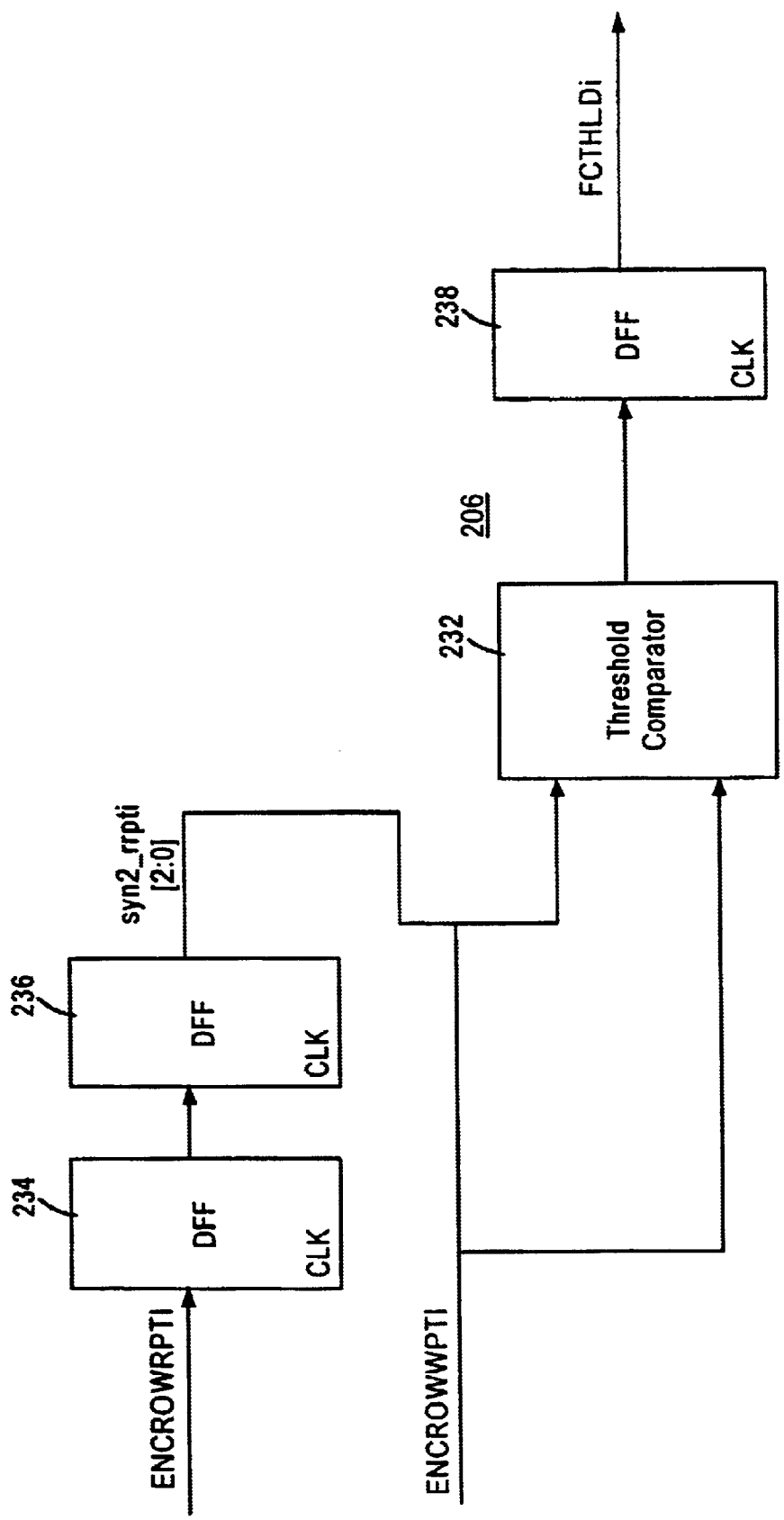
FIG. 9 is a block diagram of threshold status logic.

As shown in FIG. 9, the threshold status logic 206 comprises a threshold comparator 232 for comparing the encoded row write pointer ENCROWWPTi with the encoded row read pointer ENCROWRPTi, which may be supplied via a pair of D-flip flops 234 and 236 to synchronize a read cycle with a write cycle. The threshold comparator 232 determines the number of occupied entries in the RQ data SRAM of the i-th rules queue 102, and compares this number with a preset threshold. If the number of occupied entries reaches a preset threshold, the threshold comparator 232 produces a flow control threshold signal FCTHLDi supplied to the switching subsystem 42 to signal a heavy traffic at the receive port corresponding to the i-th rules queue 102. For example, the threshold comparator 232 may produce the flow control threshold signal FCTHLDi if three or more entries in the RQ data SRAM of the i-th rules queue 102 is occupied. In this case, the flow control threshold signal FCTHLDi indicates that the receive port corresponding to the i-th rules queue 102 is close to an overflow condition.

A D-flip flop 238 may be coupled to the output of the threshold comparator 232 to provide synchronization for transferring the flow control threshold signal to the switching subsystem 42. In response to the flow control threshold signal FCTHLDi, the switching subsystem takes appropriate actions to stop data transmission from a station connected to the receive port corresponding to the i-th rules queue 102.

Thus, the present invention provides a novel method of flow control by monitoring rules queues in the IRC.

What is claimed is:

1. A multiport data communication system for transferring data packets between ports, the data communication system comprising:

a plurality of receive ports for receiving data packets, a decision making engine responsive to the received data packets for controlling transmission of the received data packets to at least one selected transmit port, the decision making engine including:

a plurality of queuing devices corresponding to the plurality of the receive ports for creating queues of data blocks representing the data packets received by the corresponding receive ports, logic circuitry responsive to the plurality of queuing devices for processing the data blocks in accordance with a prescribed algorithm to identify the at least one selected transmit port for each data packet, and a flow control circuit for monitoring the queues of data blocks to produce a flow control threshold signal for a selected queue of data blocks to indicate a heavy traffic condition of a receive port corresponding to the selected queue.

2. The system of claim 1, wherein the flow control circuit is configured to produce the flow control threshold signal for a selected queue of data blocks when content of the selected queue reaches a preset value.

3. The system of claim 1, wherein the flow control circuit is configured to produce the flow control threshold signal for a selected queue, when the selected queue accumulates a predetermined number of the data blocks.

4. The system of claim 2, wherein the flow control circuit comprises a threshold circuit for comparing a write pointer to a selected queue with a read pointer to the selected queue to determine content of the selected queue.

5. The system of claim 4, wherein the flow control circuit further comprises a write pointer circuit for producing the write pointer.

6. The system of claim 5, wherein the write pointer circuit comprises a write pointer selector for selecting the write pointer for the selected queue.

7. The system of claim 6, wherein the write pointer selector is controlled by write enabling signal that enables writing the data blocks into the selected queue.

8. The system of claim 6, wherein the write pointer circuit further comprises an incrementing/encoding circuit for incrementing and encoding a selected write pointer produced by the write pointer selector.

9. The system of claim 4, wherein the flow control circuit further comprises a read pointer circuit for producing the read pointer.

10. The system of claim 9, wherein the read pointer circuit comprises a read pointer selector for selecting the read pointer for the selected queue.

11. The system of claim 10, wherein the read pointer selector is controlled by a grant signal that enables reading the data blocks from the selected queue.

12. The system of claim 11, wherein the grant signal is produced by a scheduler responsive to a request from a queuing devices holding the selected queue.

13. The system of claim 10, wherein the read pointer circuit further comprises an incrementing/encoding circuit for incrementing and encoding a selected read pointer produced by the read pointer selector.

14. The system of claim 2, wherein each queuing device comprises a queue memory array arranged in rows and columns for storing a queue of data blocks.

15. The system of claim 14, wherein the flow control circuit is configured to compare a write row pointer indicating a row for writing the data blocks into a selected queue memory array with a read row pointer indicating a row for reading the data blocks from the selected queue memory array.

16. In a communication system having a decision making engine for controlling data forwarding between a receive port of a plurality of receive ports and at least one transmit port, a method of flow control comprising the steps of:
    placing data blocks representing received data packets in a plurality of data queues to be processed by the decision making engine, the plurality of data queues corresponding to the plurality of the receive ports,
    processing the data queues by logic circuitry in accordance with a prescribed algorithm to determine the at least one port, and
    monitoring the data queues to produce a flow control threshold signal for a selected data queue to indicate a heavy traffic condition of a receive port corresponding to the selected data queue.

17. The method of claim 16, wherein the flow control threshold signal is produced when content of the selected data queue reaches a preset value.

18. The method of claim 17, wherein the step of monitoring comprises selecting a write pointer indicating write data memory locations for writing the data blocks into the selected data queue.

19. The method of claim 18, wherein the step of monitoring further comprises selecting a read pointer indicating read data memory locations for reading the data blocks from the selected data queue.

20. The method of claim 19, wherein the step of monitoring further comprises comparing the write pointer with the read pointer to determine when the content of the selected data queue reaches the preset value.

* * * * *